C. P. BETTENGA.
ANIMAL FEEDING DEVICE.
APPLICATION FILED FEB. 6, 1920.

1,366,052.

Patented Jan. 18, 1921.

Inventor,
C. P. Bettenga, by
G. C. Kennedy,
Attorney.

UNITED STATES PATENT OFFICE.

CRENO P. BETTENGA, OF PARKERSBURG, IOWA.

ANIMAL-FEEDING DEVICE.

1,366,052.     Specification of Letters Patent.     Patented Jan. 18, 1921.

Application filed February 6, 1920. Serial No. 356,605.

*To all whom it may concern:*

Be it known that I, CRENO P. BETTENGA, a citizen of the United States of America, and a resident of Parkersburg, Butler county, Iowa, have invented certain new and useful Improvements in Animal-Feeding Devices, of which the following is a specification.

My invention relates to improvements in animal feeding devices, and the objects of my improvements are first to construct such a device with means for insuring ready and unimpeded delivery of the contents of the hopper to the feeding trough of the vessel; second, to combine with said device a smaller and auxiliary device of similar character for delivering unimpededly a supply of medicament or other material into a special and segregated part of said feeding vessel, and third, to furnish a flexible, freely movable, depending curtain or curtains to normally screen the feeding space or spaces of the device.

Figure 1:
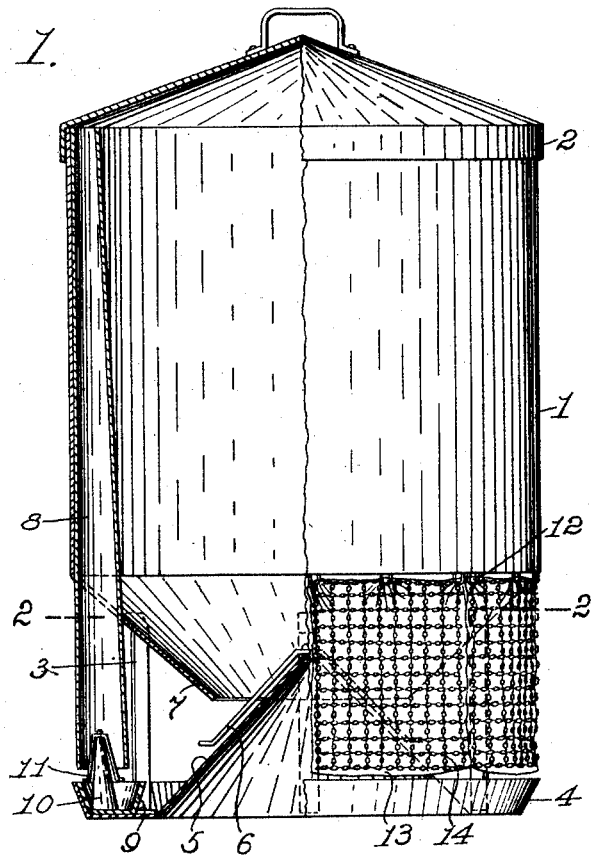
Figure 2:
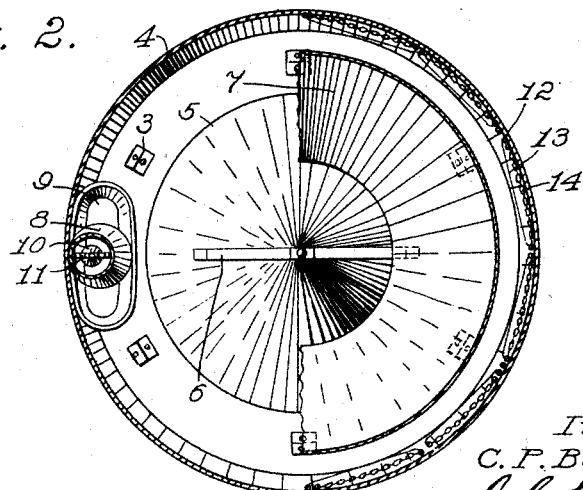

These objects I have accomplished by the means which are hereinafter described and claimed, and which are illustrated in the accompanying drawings, in which Figure 1 is a view, partly in elevation and partly in central vertical transverse section, of my improved animal feeding device, and Fig. 2 is a horizontal section of the same, taken on the broken line 2—2 of said Fig. 1, and looking downwardly, with part of the hopper bottom broken away.

Similar numerals of reference denote corresponding parts throughout the several views.

1 is a vertically disposed hollow cylindrical hopper whose upper open end is covered by a removable conoidal closure 2. The bottom 7 of said hopper is in the form of a hollow conical frustum, and said hopper is supported fixedly on a number of standards 3 whose lower ends are secured to the bottom of the circular vessel 4, having a low marginal and inclined rim. This vessel is concentric with and spaced below the open end of the frustal bottom 7 of said hopper, and the central part of the bottom of said vessel is formed with the hollow cone 5 whose apex extends upwardly into and through the opening of said frustum, but spaced therefrom. 6 is a bar bent medially into two oppositely inclined members, the middle of the bar being pivotally mounted upon the apex of the cone 5, and said members extending downwardly close to but spaced from the outer surface of the cone through the interspace of the cone and said frustum 7.

8 is a vertically disposed tube, open at both ends, mounted within the hopper 1 abutting upon the inner wall thereof and having its lower part depending through an opening in the frustum 7 nearly to the top of the marginal wall of the vessel 4 so as to deliver into the annular trough of said vessel, or into an open receptacle 9. A small cone 10 is fixed in the receptacle 9 to extend into the open lower end of the tube 8 in spaced relation thereto, and a small bent bar 11, similar to the bent bar 6, is likewise rotatably mounted on the top of said cone. The tube 8 is preferably formed to progressively widen from its upper toward its lower end, to provide ample clearance and ready delivery for its contents.

Staples 12 or other suitable hangers are mounted around the angle of junction of the lower part of the cylindrical body of the hopper 1 and the frustum 7. A series of screening curtains 14 made of inter-connected chain links, are hung on the staples 12 and depend nearly to the upper edge of the marginal rim of the vessel 4. Inside of the flexible intersticed curtains thus produced may be suspended on said staples cloth curtains 13.

The inwardly sloping frustal bottom 7 of the hopper affords ample clearance or head room for a hog or other animal feeding from the vessel 4, and as the upper edge of the marginal rim of the vessel 4 is positioned immediately below the cylindrical walls of the hopper 1, the contents of said vessel are covered and protected from the action of the elements, as also measurably by the curtains 13 and 14 when both are used. Either set of these curtains may be used without the other. The outer curtains 14 of closely intermeshed linked structure prevent poultry from entering or feeding from the vessel 4, or fouling its contents. These curtains are secured only at their upper ends, consequently, are severally freely movable inwardly, that is, may be pushed inwardly by the head of the animal before feeding. Because of the weight of the chain curtains 14, they always return by gravity to their normal positions.

During feeding, heads of the animals will contact with and rotatingly shift the steering-device 6, which, in traversing the interspace of the cone 5 and frustum 7, breaks up and dislodges any compacted portions of the contents of the hopper, permitting them to freely issue into the vessel 4. The same result will accrue with the small steering device 11. Medicated substances, or salt, may be deposited in the tube 8 to be delivered into the receptacle 9, from which it can be licked by the animal, the consequent vibration of the stirring device 11 coupled with the widening of the tube 8 downwardly, permitting the contents to freely issue without remaining compacted.

The various details of my invention may, of course, be considerably varied without departing from the principles thereof or the scope of its protection.

Having described my invention, what I claim as new, and desire to secure by Letters Patent, is:

1. An animal feeding device, comprising an open top feeding vessel, a hopper thereabove adapted to deliver its contents thereinto, and a curtain hung from said hopper to depend movably over said vessel, said curtain being formed of connected chains.

2. An animal feeding device, comprising an open top vessel, a hopper having an open bottom positioned over said vessel, the outer wall of the hopper being above the outer wall of said vessel, and a flexible curtain suspended from said hopper to traverse movably the interspace of the outer walls of the hopper and said vessel, said curtain being formed of interconnected links.

3. An animal feeding device, comprising an open top vessel, a hopper having an open bottom above and delivering into said vessel, and curtaining means depending movably from said hopper toward said vessel, consisting of an outer curtain of interconnected links, and an inner liner of flexible material.

4. An animal feeding device, comprising an open top vessel having a conically raised bottom, a smaller open top receptacle positioned within said vessel and having a conically raised bottom, a hopper above said vessel having an opening in its bottom surrounding and spaced from the raised conical bottom of the vessel, and an open-ended tube above the said smaller receptacle, with its open lower end surrounding and spaced from the conical bottom of the latter.

Signed at Waterloo, Iowa, this 24th day of January, 1920.

CRENO P. BETTENGA.